United States Patent [19]
Jansen et al.

[11] 3,909,159
[45] Sept. 30, 1975

[54] VARIABLE DISPLACEMENT PUMP FOR GAS TURBINE FUEL MANAGEMENT SYSTEM

[75] Inventors: Harvey B. Jansen; Milton R. Adams, both of Tempe, Ariz.

[73] Assignee: The Garrett Corporation, Los Angeles, Calif.

[22] Filed: Mar. 5, 1973

[21] Appl. No.: 338,022

[52] U.S. Cl........ 417/374; 60/39.16 R; 60/39.28 R; 417/471
[51] Int. Cl.............................................. F04b 9/04
[58] Field of Search.............. 417/471; 123/139 AH; 60/39.28 R

[56] References Cited
UNITED STATES PATENTS

| | | | |
|---|---|---|---|
| 2,165,696 | 7/1939 | Charter | 417/471 X |
| 2,171,209 | 8/1939 | Folsom | 417/471 X |
| 2,809,868 | 10/1957 | Thompson | 123/139 AH |
| 2,901,030 | 8/1959 | Chadwick | 60/39.28 R |
| 3,123,128 | 3/1964 | Zeisloft | 60/39.28 R |
| 3,143,969 | 8/1964 | Eames | 417/471 X |
| 3,667,740 | 6/1972 | Mortstedt | 417/471 X |
| 3,768,249 | 10/1973 | Lewis | 60/39.28 R |

*Primary Examiner*—Clarence R. Gordon
*Attorney, Agent, or Firm*—Herschel C. Omohundro; Jack D. Puffer; Albert J. Miller

[57] ABSTRACT

This variable displacement pump for a gas turbine fuel management system has a movable differential diaphragm assembly, one diaphragm of which pumps the fuel while another (the actuator diaphragm) effects movement of the assembly in response to forces applied thereto mechanically in response to engine operation, resiliently by spring force, and controlled fluid pressure. The displacement is varied to change the speed of the gas turbine controlled thereby by changing the pressure applied to the actuator diaphragm either through a flyweight governor driven by the gas turbine or such governor in combination with a throttle. In addition, the turbine speed may be varied by an electrically actuated valve disposed in the fuel line between the pump and the point of use. For starting purposes, a resilient force through the medium of a spring is applied to the actuator diaphragm. A combined spring and pressure actuated diaphragm is employed to maintain pressure on the fuel between the pump outlet and point of use, during the induction of fuel to the pump. In the event the gas turbine is provided with a free, or power turbine, a second flyweight governor could be utilized to change or limit the pressure applied to the actuator diaphragm and thus prevent undesired over-speed of the engine.

26 Claims, 5 Drawing Figures

VARIABLE DISPLACEMENT PUMP FOR GAS TURBINE FUEL MANAGEMENT SYSTEM

BACKGROUND OF THE INVENTION

This invention relates generally to pumps and more particularly to fuel pumps of the type employed in fuel systems of engines usually, but not necessarily, consuming liquid fuel. More specifically, the invention is directed to a variable displacement pump for a gas turbine fuel management system.

The fuel pump of the invention is of the type falling generally in the classes exemplified by U.S. Pat. Nos. 3,220,184 to Oprecht and 3,267,670 to H. L. Mc-Combs, Jr. Other patents embodying some similar features are U.S. Pat Nos. 2,307,566 to Browne, 2,171,209 to Folsom, and 1,649,356 to Louis.

SUMMARY OF THE INVENTION

An object of this invention is to provide a variable displacement pump particularly adapted for a gas turbine management system by including structure which will respond to various functions and outputs of the turbine to control turbine operation.

Another object of the invention is to provide a variable displacement pump having a reciprocating differential area spring loaded diaphragm assembly which may be mechanically actuated in a direction to induce fuel flow to the pump and fluid pressure operated in the opposite direction to inject fuel into the engine. Both mechanical and fluid pressure actuations may be responsive to engine operation.

Still another object of the invention is to provide a variable displacement pump of the type mentioned in the previous paragraph having an adjustable spring for loading the diaphragm assembly in the fuel injecting direction to facilitate the engine starting operation prior to or during the time the engine compressor is initially building air pressure.

A further object of the invention is to provide a variable displacement pump of the type referred to above with means for applying controlled compressor discharge pressure to the diaphragm assembly to effect the fuel injecting movement thereof and to regulate the application of pressure in accordance with engine operating parameters whereby most efficient engine performance will result.

Another object of the invention is to provide the variable displacement pump mentioned above with means for maintaining fuel pressure between the pump outlet and point of fuel injection during the time the diaphragm assembly of the pump is moving in a direction to induce fuel flow from the source of the pump.

Still another object is to provide the pump referred to with additional means for varying the volume of fuel injected into the engine through the medium of an electrically actuated valve operated in accordance with electrical power produced by a generator driven by the engine equipped with the pump.

A further object of the invention is to provide a variable displacement pump for an engine fuel management system which will be particularly adaptable for use in a vehicle to secure optimum emission control and cycle efficiency.

Other objects and advantages will be made apparent by the following description of one form of the invention shown schematically in the accompanying drawings.

IN THE DRAWINGS

Figure 1:
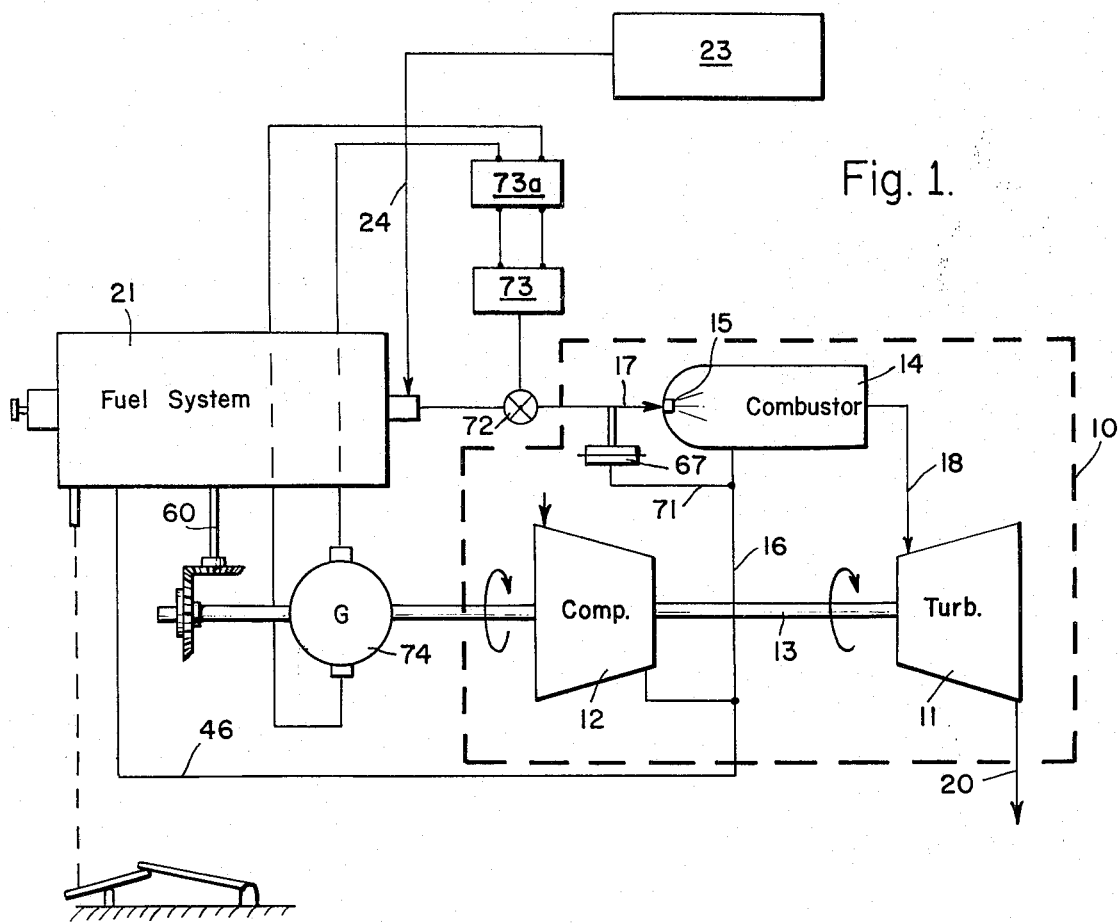
FIG. 1 is a schematic view of gas turbine engine with a fuel management system embodying the principles of the present invention.

Referring more particularly to FIG. 1 of the drawings, the reference numeral 10 designates generally a gas turbine engine to which the pump and fuel management system of the invention is particularly, although not exclusively, adaptable. As usual, the engine 10 has turbine and compressor components 11 and 12, respectively, with a connecting rotatable shaft 13. A combustor 14 with a fuel nozzle 15 receives compressed air from the compressor through a passage 16 and fuel through a line 17 and burns a mixture thereof to provide hot gases which flow to the turbine via passage 18 to effect engine operation. Spent gases may be discharged to the atmosphere through outlet 20. Operation of the engine is controlled primarily by varying the amount of fuel supplied to the combustor 14.

Figure 2:
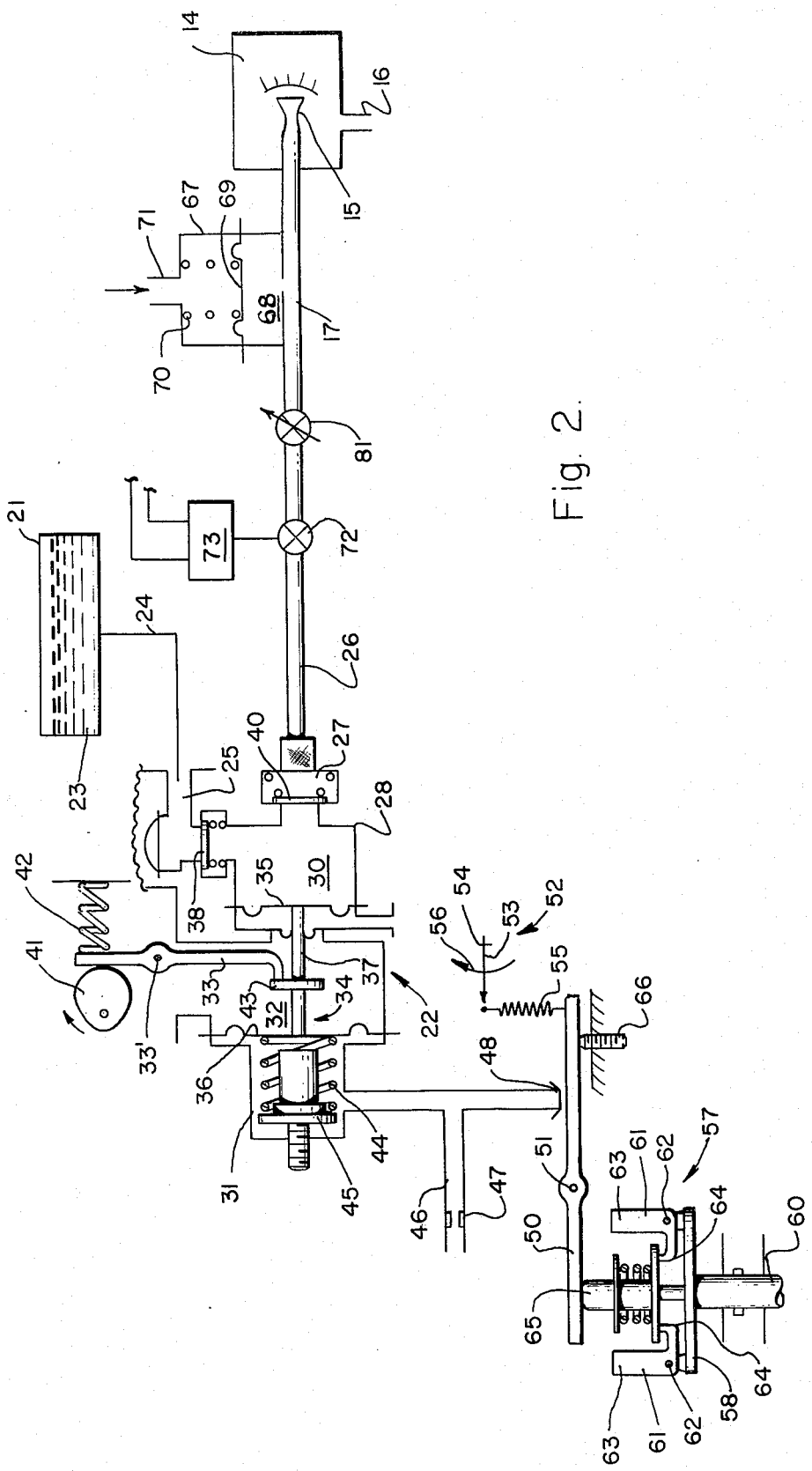
FIG. 2 is an enlarged schematic view of the fuel management system shown in FIG. 1.

The invention herein relates particularly to the fuel management system, designated generally by the numeral 21 in FIG. 1, and the fuel pump 22 forming a part thereof. FIG. 2 is an enlarged schematic view of the fuel management system and pump.

As shown in FIG. 2, the system 21 includes a fuel source 23 contained in a reservoir or tank from which a line 24 leads to the inlet 25 of the pump 22. Another line 26 leads from the outlet 27 of the pump to the nozzle 15 of the combustor 14. In general, the fuel pump has a casing 28 suitably formed to include a fuel pumping chamber 30 and an actuator chamber 31. In the pump illustrated, these chambers are spaced as at 32 to accommodate a lever 33 the purpose of which will be set forth hereinafter.

The pump includes a differential diaphragm assembly 34 supported in the casing 28 for reciprocatory movement. This assembly has a pumping diaphragm 35 peripherally supported in the casing to provide a movable wall at one side of the pumping chamber 30. Such assembly also has an actuator diaphragm 36 also peripherally supported to provide a movable wall at one side of the actuator chamber 31. The diaphragms are connected by a rod 37 so that they will move together. It will be noted at this time that diaphragm 36 is larger in diameter than diaphragm 35 for a reason to be explained later, the area ratio of the diaphragms selected for illustration being 2:1, although other ratios may be employed where found desirable.

It will be noted also that inlet 25 is equipped with a one-way check valve 38 to prevent flow from chamber 30 to line 24. Outlet 27 likewise has a one-way check valve 40 to prevent flow from line 26 back into chamber 30. Obviously, when diaphragm 35 is moved in the direction to enlarge chamber 30, fuel will be induced to flow from tank 23 into chamber 30. When diaphragm 35 is moved in the opposite direction to decrease the size of chamber 30, fuel therein will be pressurized and will flow past check valve 40 into line 26 which leads to fuel nozzle 15. The latter has restricted outlets and is exposed to air at compressor discharge pressure; therefore, the fuel in the chamber 30 and line 26 will necessarily have to be pressurized to be injected into the combustor.

The diaphragm assembly is mechanically and positively moved in a direction to cause fuel flow from the reservoir into the chamber 30 by lever 33 swinging about its pivot 33' in response to rotation of a cam 41 driven from the turbine shaft 13. One end of the lever 33 is resiliently urged toward the cam by a spring 42 while the other end is engaged with a shoulder 43 provided on rod 37. When cam 41 engages lever 33 and moves it about pivot 33', the lever will move the diaphragm assembly in the fuel inducing direction and chamber 30 will be filled with fuel.

Diaphragm assembly 34 is yieldably moved in a direction to expel fuel from chamber 30 by a combination of spring force and fluid pressure applied to the actuator diaphragm 36. Chamber 31 contains a spring 44 one end of which engages diaphragm 36, the other end engaging an adjustable abutment member 45 threaded into the casing 22. This abutment member may be adjusted toward and away from diaphragm 36 to change the spring force applied to the actuator diaphragm. Such force is employed to provide fuel pressure for the engine starting operation before the compressor starts to generate pressure. As the engine rotation increases and compressor discharge pressure builds up, it is used to supplement the spring force applied to the actuator diaphragm.

To utilize the compressor discharge pressure in this manner, a line 46 establishes communication between chamber 31 and the compressor discharge 16. This line contains a restriction 47 and a bleed-off orifice 48 opening to the atmosphere between restriction 47 and the chamber 31.

The compressor discharge pressure applied to the diaphragm may be varied by changing the effective size of the bleed-off orifice 48. This operation is performed by moving one end portion of a bleed control lever 50 toward and away from the orifice. Lever 50 is pivoted as at 51. The position of the lever 50 relative to the orifice 48 may be changed to control normal engine operation through manual actuation of a throttle 52. In the form of the invention shown, throttle 52 includes a lever 53 pivoted as at 54 for swinging movement. Spring 55 between lever 53 and lever 50 yieldably urges bleed control lever 50 toward an orifice restricting position when the throttle lever 53 is moved in the direction of arrow 56, in FIG. 2, to increase engine speed.

It should be obvious that by restricting orifice 48 the volume of fluid bled therefrom will be reduced and the fluid pressure in chamber 31 will be increased. As a result the force applied to diaphragm 36 will also be increased which will in turn increase fuel pressure, causing the injection of more fuel into the combustor and an increase in engine speed. To decrease engine speed, the effective size of orifice 48 is increased and fluid pressure in chamber 31 thus reduced. Less force will be applied to diaphragm 36 and consequently diaphragm 35 will apply a decreased force to the fuel in chamber 30 and line 26. Since fuel pressure is decreased, less fuel will be injected into the combustor and the engine will decelerate. Thus, by controlling bleed from orifice 48 engine operation can be regulated.

To more completely control bleed from orifice 48 and consequently engine operation, the effects of throttle action are modified in accordance with selected parameters of engine operation. One way to accomplish this result is through the use of a turbine driven flyweight governor 57 forming part of the form of fuel management system selected for illustration. Governor 57 is of a substantially conventional type having a head 58 fixed for rotation with a shaft 60 driven by the engine. Head 58 has a plurality of bell crank levers 61 pivoted thereon, as at 62, for swinging movement in response to centrifugal force on the weighted ends 63. Levers 61 have arms 64 arranged to engage and move a slidable plunger 65 toward lever 50 at the end thereof on the opposite side of pivot 51 from the orifice 48. When the engine begins to accelerate, the governor 57 operates to move bleed control lever 50 in a direction to increase the effective area of orifiice 48 and the fluid pressure in chamber 31 will be prevented from increasing. The fuel pressure will likewise be limited and the engine speed will be prevented from further increase at the particular throttle setting.

To increase engine speed, the throttle 52 will then have to be moved in the direction of arrow 56 to a new setting in which the bleed control lever 50 again restricts the effective area of orifice 48 and pressure in chamber 31 starts to increase to cause additional fuel flow to the combustor. As engine speed again starts to accelerate, the governor 57 once more assumes control and the foregoing operations are repeated. Obviously, the governor controls the engine speed by resetting the tension of the resilient connection between the bleed control lever 50 and the throttle. Engine operation is thus effectively controlled by the combination of the throttle and governor.

It should be noted that due to the resilient connection between the throttle 52 and the bleed control lever 50 provided by spring 55, the lever 50 may be moved by the governor in an orifice opening direction even though the throttle is held in position to normally cause engine acceleration. When the throttle is moved toward a so-called position, the bleed through orifice 48 will increase and cut fuel flow to the engine; it will then decelerate to an idle speed which may be determined by the position of a deceleration stop 66. When lever 50 is engaged with such stop, orifice 48 will not restrict bleed and no fluid pressure will be applied to diaphragm 36. The resistance to fuel injection may at this time be sufficient to hold the diaphragm 36 fully retracted so that no fuel will be injected and the engine will decelerate under minimum power.

Figure 4:
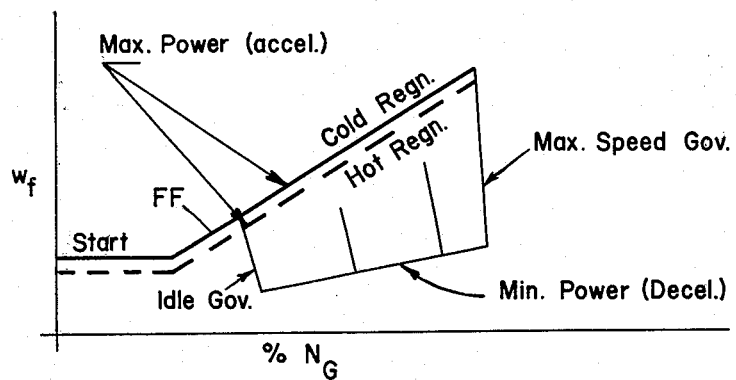
FIG. 4 is a graphic plot of the weight flow of fuel relative to engine speed during a typical opeerating cycle of the fuel management system.

A graphic plot of the weight flow of fuel relative to engine speed during a typical cycle of operation of the fuel management system is shown in FIG. 4. The curve FF shows fuel flow to start engine operation and the increase during acceleration while developing maximum power. If, during the acceleration, the position of the throttle is maintained, the governor 57 assumes control and only that quantity of fuel sufficient to maintain engine speed at the particular throttle setting will be injected. When the engine reaches maximum speed at full power due to this movement of the throttle to "full open" position, the governor will maintain such operating condition until the throttle is moved toward a closed position and fuel flow will be decreased permitting the engine to decelerate at minimum power. As previously mentioned, fuel flow at this time may be substantially nil or only that necessary to prevent flame-out.

As indicated by the dotted line in FIG. 4, a reduction in fuel requirements will result if a hot regenerator is employed.

From FIG. 2 it will be observed that line 26 is provided with an accumulator-like device 67 having a chamber 68 communicating with line 26. One wall of such chamber comprises a diaphragm 69 which is urged in a direction to decrease the chamber volume by a spring 70. Fluid pressure from the compressor discharge is also applied through a line 71 to the spring pressed side of the diaphragm. The device 67 might be termed a "pulsator" in that the fuel pressure opposes movement of the diaphragm in response to spring and compressor discharge pressure. The pulsator serves to maintain fuel pressure in line 26 when diaphragm 35 is moved by cam actuated lever 33 in a direction to draw fuel into chamber 30 from tank 23. Due to the construction of lever 33 and diaphragm assembly 34, the lever 33 moves the latter only in one direction, i.e., to charge chamber 30 with fuel, and if sufficient resistance to fuel injection is offered, the diaphragm assembly may remain in a retracted state, even though cam 41 continues to rotate.

FIG. 2 also shows line 26 with a control valve 72 which might be termed a safety valve. This element has a proportional solenoid actuator 73 which is connected in an electronic control circuit including an electric generator 74 connected for operation by the turbine (See FIG. 1) and computer means, represented by block 73a, which drives the solenoid 73 in proportion to the speed dependent current produced by the generator 74. In the event the engine speed increases excessively, the solenoid will move the valve in a closing direction to limit or decrease fuel flow to the engine to either stabilize the speed or cause deceleration. Other parameters of engine operation, such as turbine inlet or exhaust temperatures, could apply signals to the electronic control circuit to proportionally actuate the solenoid valve and govern fuel feed.

Figure 5:
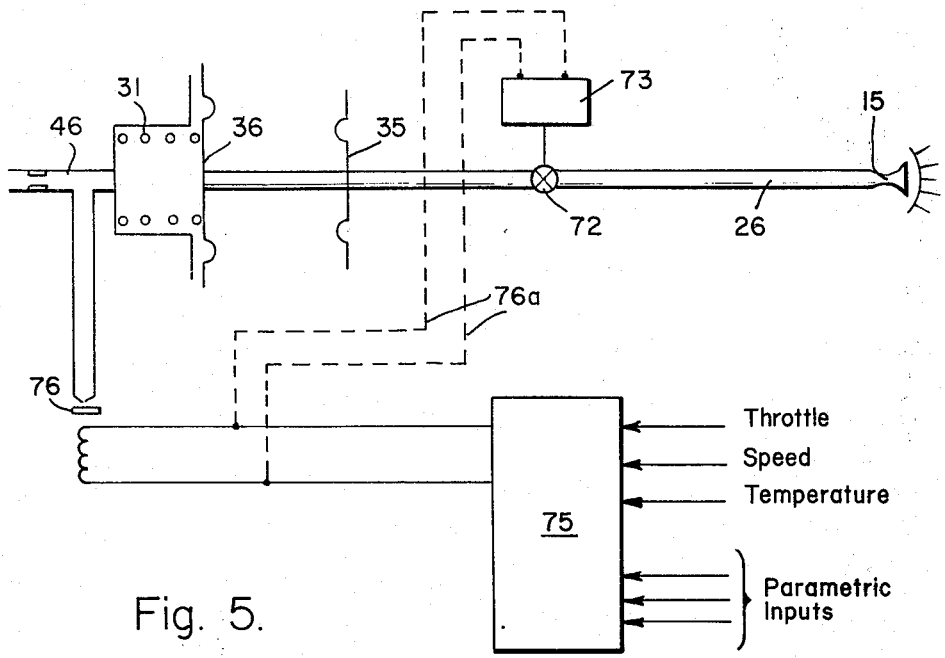
FIG. 5 is a diagrammatic view illustrating the basic principles of the fuel management system of the present invention.

As indicated in FIG. 5, signals dependent upon throttle position and engine operating conditions may be supplied to a computer 75 of suitable type, i.e., electronic, pneumatic, hydromechanical, or a hybrid thereof, the output of which is employed to proportionally operate an element 76 to control bleed from the chamber 31 of the fluid pressure responsive actuator of the fuel pump.

FIG. 5 also shows by dotted lines 76a that the output from the computer 75 could be applied to solenoid 73 for actuation of valve 72 in the fuel feed line 26 to govern engine operation in accordance with any form of computation.

Figure 3:
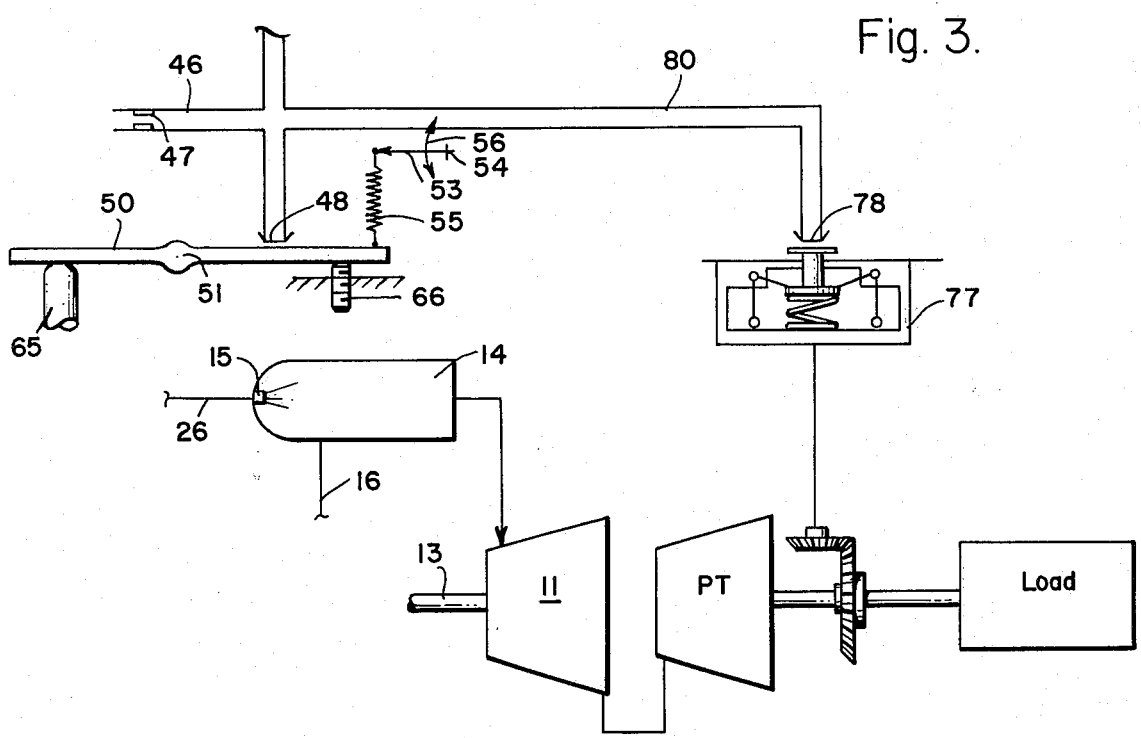
FIG. 3 is a fragmentary schematic view of a gas turbine engine having a power turbine equipped with means for supplementing the fuel management system shown in FIG. 2.

As shown in FIG. 3, the fuel management system may be modified to adapt it to a gas turbine engine wherein the exhaust from the first turbine 11 is applied to a second turbine PT frequently employed as a power turbine to drive some suitable load L. As modified, a second flyweight governor 77 is provided to control bleed from a second control orifice 78 connected by a line 80 with line 46 and chamber 31 at the downstream side of orifice 47. Governor 77 is substantially the same as governor 57 but is arranged to be driven by the power turbine and may be set to be normally closed except during overspeed of the power turbine. This governor proportionally reduces fuel flow in a manner similar to governor 57 by bleeding compressed air from chamber 31.

If desired, an additional safety feature in the form of a temperature responsive valve 81 may be employed in the fuel line 26. This valve may be made responsive to the turbine inlet temperature and will function to reduce fuel flow to the combustor when turbine inlet temperature starts to exceed a predetermined value. It should be obvious that the temperature generated signal could be applied to the electronic control 73a of the proportional solenoid actuator 73, if desired.

From the foregoing it has been shown that a fuel management system for a gas turbine engine having a combination of inputs including a manual throttle signal, a speed responsive signal, a temperature responsive signal, a pressure responsive signal, and a combination of all such signals has been provided. These signals may be employed to pneumatically or electronically govern fuel injection.

As indicated in FIG. 5, a combination of such controls is shown in which signals from the throttle, from a speed sensor, temperature sensors in many different locations, and from sensors of other parameters may be supplied to a computer of electronic, pneumatic, hydromechanical, or hybrid design to proportionally control bleed from a fluid pressure actuator to govern fuel feed. Signals from the computer may also be supplied to a proportionally responsive solenoid valve in the pressurized fuel line to control feed to the engine.

We claim:

1. A variable displacement pump for a gas turbine fuel management system comprising:
   a. an element disposed for movement in one direction to draw fuel from a supply and in the opposite direction to discharge such fuel from the pump outlet under pressure to a point of use;
   b. power driven means mechanically moving said element in the said direction to draw fuel from the supply;
   c. combined resilient and fluid pressure responsive means moving said element in the direction to discharge the fuel to the point of use;
   d. means for varying the fluid pressure applied to said last-named means to govern the rate of fluid discharge by said element; and
   e. throttle means for manually adjusting the effectivity of said fluid pressure varying means.

2. The variable displacement pump of claim 1 in which said element has a parameter bearing a predetermined relation to the volume of fuel discharged per cycle of movement.

3. The variable displacement pump of claim 1 in which said element has a flexible diaphragm.

4. The variable displacement pump of claim 1 in which the combined resilient and fluid pressure responsive means has a flexible diaphragm.

5. The variable displacement pump of claim 3 in which the combined resilient and fluid pressure responsive means has a flexible diaphragm bearing a predetermined area ratio to that of said element and rigidly connected thereto.

6. The variable displacement pump of claim 5 in which the area ratio of the flexible diaphragm of said combined resilient and fluid pressure responsive means relative to the flexible diaphragm of said element is substantially two to one.

7. The variable displacement pump of claim 1 in which the power driven means for mechanically moving said element includes a cam and lever.

8. The variable displacement pump of claim 1 in which the means for varying the fluid pressure applied to said combined resilient and fluid pressure responsive means is speed responsive.

9. The variable displacement pump of claim 1 in which the means for varying the fluid pressure applied to said combined resilient and fluid pressure responsive means is responsive to the speed of the gas turbine equipped with the pump.

10. The variable displacement pump of claim 1 in which the combined resilient and fluid pressure responsive means has a diaphragm and a spring urging said element in a fuel discharging direction.

11. The variable displacement pump of claim 10 in which said diaphragm is exposed to fluid pressure from the compressor of the gas turbine equipped with the pump to move said element in a fuel discharging direction.

12. The variable displacement pump of claim 11 in which the means for varying the fluid pressure applied to the diaphragm is speed responsive.

13. The variable displacement pump of claim 12 in which the speed responsive fluid pressure varying means is responsive to the speed of the gas turbine equipped with the pump.

14. A variable displacement pump for a gas turbine fuel management system comprising:
   a. an element disposed for movement in one direction to draw fuel from a supply and in the opposite direction to discharge such fuel from the pump outlet under pressure to a point of use;
   b. power driven means mechanically moving said element in the said direction to draw fuel from the supply;
   c. combined resilient and fluid pressure responsive means moving said element in the direction to discharge the fuel to the point of use;
   d. means for varying the fluid pressure applied to said last-named means to govern the rate of fluid discharge by said element said means comprising an orifice and a pivoted lever disposed for movement to control the effective size of such orifice; and
   e. throttle means for manually adjusting the effectivity of said fluid pressure varying means.

15. The variable displacement pump of claim 14 in which a flyweight type governor adapted to be driven by and responsive to the speed of the gas turbine equipped with the pump is disposed to actuate said pivoted lever.

16. The variable displacement pump of claim 15 in which an increase in turbine speed tends to cause said governor to move said pivoted lever in a direction to increase the size of said orifice and movement of said throttle means in a predetermined direction tends to oppose movement of said lever by said governor.

17. The variable displacement pump of claim 16 in which said throttle means has a member adapted to apply a yieldable load to said pivoted lever to tend to move the same in an orifice closing direction.

18. The variable displacement pump of claim 1 in which means are connected with the pump outlet to maintain pressure on the fuel between the outlet and point of use when said element is moved in the direction to draw fuel from the supply into the pump.

19. The variable displacement pump of claim 18 in which the means for maintaining pressure on the fuel between the outlet and point of use has a diaphragm exposed to spring force.

20. The variable displacement pump of claim 19 in which the diaphragm for maintaining pressure on the fuel between the outlet and point of use is also exposed on the spring pressed side to fluid pressure.

21. A variable displacement fuel pump for a gas turbine engine comprising:
   a. housing means having a fuel inlet opening and a fuel discharge opening;
   b. first movable wall means forming a first chamber in said housing means communicating with said inlet and discharge openings;
   c. second movable wall means forming a second chamber in said housing;
   d. rod means for connecting said wall means for simultaneous movement;
   e. driving means operably connected to said rod means for moving said rod means in a direction to cause said first movable wall means to draw fuel into said first chamber;
   f. a source of fluid pressure connected to said second chamber such that an increase in said pressure causes said first wall means to discharge fuel from said first chamber;
   g. resilient means connected to said rod means urging said first wall means in a direction to discharge fuel from said first chamber;
   h. control means connected between said fluid source and said second chamber for controlling the pressure in said second chamber;
   i. throttle means for actuating said control means.

22. The variable displacement pump of claim 21 in which the control means has an orifice for varying the pressure in said second chamber and a pivoted lever disposed for movement to control the effective size of said orifice.

23. The variable displacement pump of claim 22 in which a flyweight type governor adapted to be driven by and responsive to the speed of a gas turbine equipped with the pump is disposed to actuate the pivoted lever.

24. The variable displacement pump of claim 23 in which an increase in turbine speed tends to cause said governor to move said pivoted lever in a direction to increase the size of said orifice and movement of said throttle means in a predetermined direction tends to oppose movement of said lever by said governor.

25. The variable displacement pump of claim 24 in which said throttle means has member adapted to apply a yieldable load to said pivoted lever to tend to move the same in an orifice closing direction.

26. A variable displacement pump for a gas turbine fuel management system comprising:
   a. an element disposed for movement in one direction to draw fuel from a supply and in the opposite direction to discharge such fuel from the pump outlet under pressure to a point of use;

b. power driven means mechanically moving said element in the said direction to draw fuel from the supply;
c. combined resilient and fluid pressure responsive means moving said element in the direction to discharge the fuel to the point of use;
d. a source of pressurized fluid;
e. conduit means connecting said source of pressurized fluid with said combined resilient and fluid pressure responsive means;
f. control means in said conduit means for varying the fluid pressure applied to said combined resilient and fluid pressure responsive means; and
g. throttle means for adjusting said control means.

* * * * *